United States Patent
Saruwatari

(10) Patent No.: US 6,570,679 B2
(45) Date of Patent: *May 27, 2003

(54) DATA INPUT SYSTEM

(75) Inventor: Masaru Saruwatari, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 77 days.

(21) Appl. No.: 08/974,959

(22) Filed: Nov. 20, 1997

(65) Prior Publication Data

US 2002/0059361 A1 May 16, 2002

(30) Foreign Application Priority Data

Nov. 27, 1996 (JP) ............................. 8-316178

(51) Int. Cl.⁷ ............................... H04N 1/32
(52) U.S. Cl. ................ 358/468; 358/403; 709/203; 709/217; 709/218; 714/748
(58) Field of Search ................. 395/214–215; 709/217–218, 203; 358/403–406, 440, 435–439, 468, 442; 714/748; 379/57–60

(56) References Cited

U.S. PATENT DOCUMENTS

| | | | | |
|---|---|---|---|---|
| 3,671,945 A | * | 6/1972 | Maggio, Jr. ................ | 714/748 |
| 5,479,403 A | * | 12/1995 | Matsueda ................... | 370/80 |
| 5,508,819 A | * | 4/1996 | Yanagisawa ................ | 358/404 |
| 5,742,668 A | * | 4/1998 | Pepe et al. ................... | 379/58 |
| 5,881,233 A | * | 3/1999 | Toyoda et al. .............. | 709/218 |
| 6,069,706 A | | 5/2000 | Kajita et al. ............... | 358/1.15 |

FOREIGN PATENT DOCUMENTS

JP        7-168788      * 7/1995

* cited by examiner

Primary Examiner—Jerome Grant, II
Assistant Examiner—Hieu C. Le
(74) Attorney, Agent, or Firm—Fitzpatrick, Cella, Harper & Scinto

(57) ABSTRACT

When an operator sets an original on a reading unit of an image reading apparatus, and requests to read the original and assigns a communication partner on a LAN (local area network) through an operation unit, this information is transmitted to an information processing terminal connected via an interface. The information processing terminal determines if information which coincides with identification information of the assigned communication partner is present. If the result of the determination is affirmative, the information processing terminal instructs the image reading apparatus to start a reading operation. If the result of the determination is negative, the information processing terminal prohibits a reading operation. When a reading operation has been prohibited, the image reading apparatus displays the fact on the operation unit.

11 Claims, 4 Drawing Sheets

DATA INPUT SYSTEM

BACKGROUND OF THE INVENTION

1. Field of the Invention

This invention relates to a data input system for outputting input data to a predetermined communication partner.

2. Description of the Related Art

The recent rapid spread of LAN's (local area networks) is pronounced, and an environment which introduces electronic mailing as well as groupware, including, for example, electronic bulletin boards and electronic conferences, is becoming common. In such an environment, the number of peripheral apparatuses of a computer, such as a network printer, a network facsimile apparatus and the like, is increasing, and a large number of client terminals (computers) can share these apparatuses. Among these apparatuses, by simply performing operations, such as printing and transmission, at each client terminal, a network printer can provide a printout, and a network facsimile apparatus can perform facsimile transmission of a document. However, sharing of a scanner for reading an image of an original in a network is not yet realized. Conventionally, when a client terminal in a network intends to read an image of an original using a scanner, it is necessary to directly connect the scanner to the client terminal without passing through the network. Recently, a proposal has been made in which, by assigning a client on a network through an operation unit of a scanner connected via an information processing terminal for device control, an image read by the scanner is transferred to the client.

Conventionally, however, when input of image data has been assigned, the input of the image data is performed irrespective of the status of the communication partner.

Accordingly, even if output to the assigned communication partner cannot be performed for some reason, image data is input, thereby causing useless processing for the input, and a problem of how to deal with the input image data.

SUMMARY OF THE INVENTION

It is an object of the present invention to solve the above-described problems.

It is another object of the present invention to provide a system which can prevent, in advance, the input of useless data.

It is still another object of the present invention to provide a system which can easily output data to a desired communication partner.

It is yet another object of the present invention to provide an image reading system in which the operator's load is reduced.

It is yet a further object of the present invention to provide a data input system having an improved throughput.

According to one aspect, the present invention which achieves these objectives relates to a data processing apparatus including input means for inputting data, assigning means for assigning a communication partner to which the data input by the input means is to be output, confirmation means for confirming information relating to the communication partner assigned by the assigning means, and control means for performing control so that the input of the data by the input means is not executed in accordance with a result of the confirmation by the confirmation means.

According to another aspect, the present invention which achieves these objectives relates to a data processing method including the steps of inputting data, assigning a communication partner to which the data input in the inputting step is to be output, confirming information relating to the communication partner assigned in the assigning step, and performing control so that the input of the data in the inputting step is not executed in accordance with a result of the confirmation in the confirming step.

According to still another aspect, the present invention which achieves these objectives relates to a data processing method including the steps of inputting data, identifying a communication partner to which the data input in the inputting step is to be output, confirming information relating to the communication partner identified in the identifying step, and performing control so that the input of the data in the inputting step is not executed in accordance with a result of the confirmation in the confirming step.

According to yet another aspect, the present invention which achieves these objectives relates to a computer readable program, stored in a storage medium, including the steps of causing input of data, causing discrimination of a communication partner to which the data input in the inputting step is to be output, causing confirmation of information relating to the communication partner discriminated in the discriminating step, and performing control so that the input of the data in the inputting step is not executed in accordance with a result of the confirmation in the confirming step.

According to yet a further aspect, the present invention which achieves these objectives relates to a method for controlling a system including an image reading apparatus for reading an image of an original, and an information processing terminal for controlling the image reading apparatus. The method includes the steps of, in the image reading apparatus, instructing to read the image of the original, and assigning a communication partner to which image data obtained by reading the image of the original is to be output, and in the information processing terminal, confirming information relating to the assigned communication partner, and controlling the image reading apparatus so that the image of the original is not read in accordance with a result of the confirmation.

The foregoing and other objects, advantages and features of the present invention will become more apparent from the following description of the preferred embodiments taken in conjunction with the accompanying drawings.

DESCRIPTION OF THE PREFERRED EMBODIMENTS

Preferred embodiments of the present invention will now be described with reference to the drawings.

First Embodiment

Figure 1:
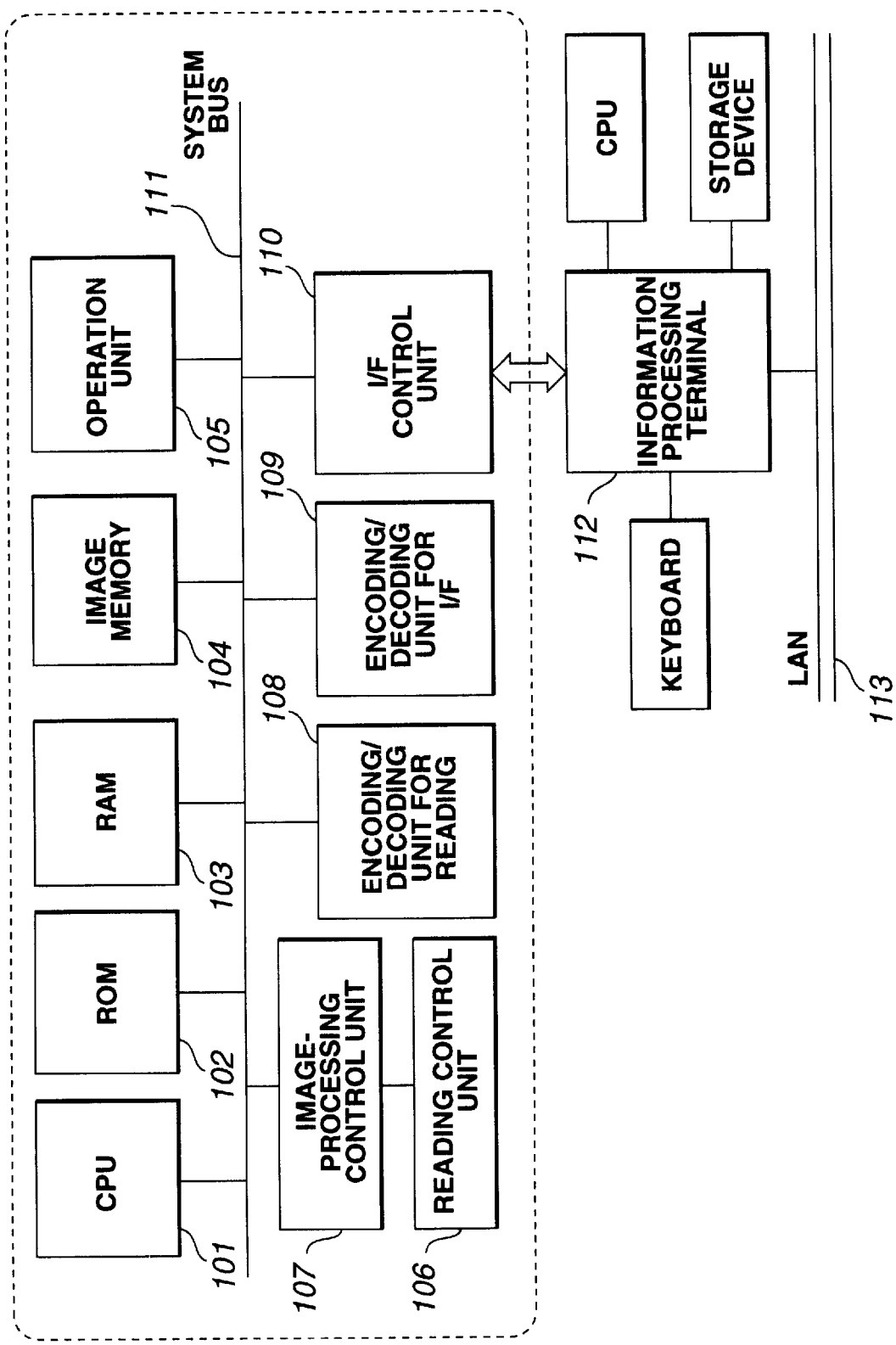
FIG. 1 is a schematic block diagram illustrating the configurations of an image reading apparatus and an information processing terminal according to a first embodiment of the present invention.

FIG. 1 is a schematic diagram illustrating the configuration of an image reading system according to a first embodiment of the present invention.

In FIG. 1, the image reading system includes an image reading apparatus enclosed by broken lines and an information processing terminal having the role of an interface between the image reading apparatus and a LAN.

A CPU (central processing unit) 101 serves as a system control unit to control the entire image reading apparatus via a system bus 111. A ROM (read-only memory) 102 stores control programs with which the CPU 101 performs control, operating-system (OS) programs, and the like. A RAM (random access memory) 103 comprises an S(static)RAM or the like, and stores program control variables and the like. Set values registered by the operator, control data of the system, buffer storages for various kinds of works, and the like are also stored in the RAM 103. An image memory 104 comprises a D(dynamic)RAM or the like, and stores image data. In the first embodiment, various control programs stored in the ROM 102 are subjected to software control, such as scheduling, task switching and the like, under the control of the OS stored in the ROM 102.

An operation unit 105 includes various kinds of keys, LED's (light-emitting diodes), an LCD (liquid-crystal display) and the like. For example, the operation unit 105 is used by the operator to perform various kinds of input operations, and displays the operational state of the image reading system.

A reading control unit 106 includes a CS image sensor, an original-conveying mechanism and the like. The reading control unit 106 optically reads an image of an original in the form of a sheet or a book using the CS image sensor, and converts the read image into electrical image data. An image processing unit 107 performs various kinds of image processing, such as binary-coding processing, halftone processing and the like, and outputs high-definition image data. The output image data is encoded according to a predetermined encoding method by an encoding/decoding unit 108 for reading and is stored in the image memory 104.

An I/F control unit 110 performs interface control with the externally connected information processing terminal 112. In the first embodiment, the I/F control unit 110 is, for example, a parallel interface, such as a two-way Centronix interface or the like. However, the I/F control unit 110 may, of course, be a serial interface. When transferring image data to the external information processing terminal 112 via the interface, an encoding/decoding unit 109 for the I/F performs necessary encoding/decoding processing if it is necessary depending on the kind of an image stored in the image memory 104, and transfers the obtained image data to the information processing terminal 112.

By exchanging commands of a predetermined format, parameters, data and the like via the I/F control unit 110, the information processing terminal 112 can, for example, operate and control the image reading apparatus. In addition to being connected to the image reading apparatus via the I/F control unit 110, the information processing terminal 112 is also connected to a LAN 113. The information processing terminal 112 has a large-capacity storage device, which includes a plurality of memory areas corresponding to respective clients on the LAN 113, and stores information relating to the respective clients, image data to be transmitted to clients, and the like. The information processing terminal 112 also includes a keyboard used for various kinds of inputs.

Application software and driver software for operating and controlling the image reading apparatus and for controlling the LAN 113 are installed in the information processing terminal, and are executed by a CPU.

A plurality of client machines operating in accordance with a common protocol are connected to the LAN 113.

Figure 2:
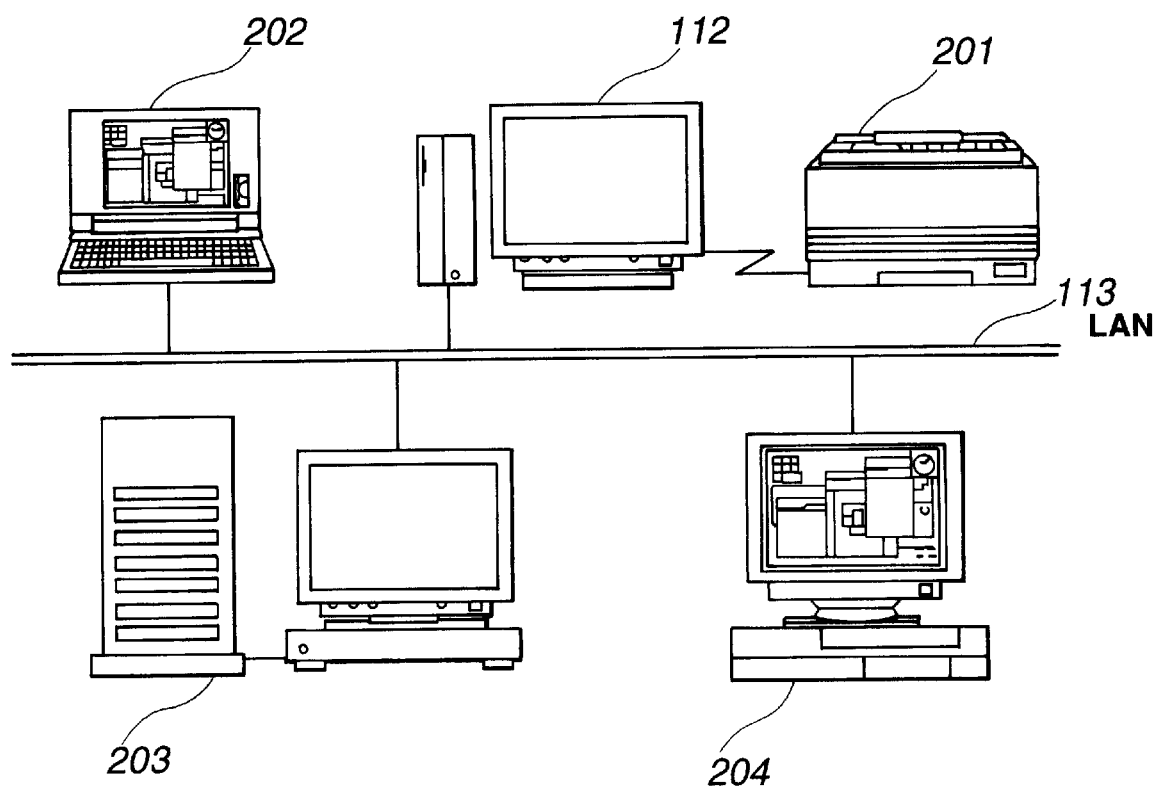
FIG. 2 is a schematic diagram illustrating a system in which the image reading apparatus and the information processing terminal shown in FIG. 1 are connected to a network.

FIG. 2 is a schematic diagram illustrating the configuration of the network when the image reading system shown in FIG. 1 is connected to the LAN 113.

In FIG. 2, reference numeral 201 represents the image reading apparatus shown in FIG. 1.

Client machines 202–204 exchange data within the LAN 113 in accordance with the common protocol. Application software for exchanging data within the LAN 113 and application software for processing image data are installed in each of the client machines, and are executed by a CPU of the each client machine.

Next, a description will be provided of processing in the above-described configuration.

In the first embodiment, exchange of commands, response and the like between the image reading apparatus 201 and the information processing terminal 112 constituting the image reading system are led by the information processing terminal 112 in such a manner that the image reading apparatus 201 transmits a response to a command provided from the information processing terminal 112. In the first embodiment, a request for reading is sent from the image reading apparatus 201 to the information processing terminal 112 by adding the request to the latest response present when the operator has provided the request for reading, as additional information. The information processing terminal 112 transmits a command corresponding to this request to the image reading apparatus 201 in order to start reading of an original.

The information processing terminal 112 constituting the image reading system of the first embodiment is connected to the LAN 113. A memory area indicated by identification information included in each kind of command or response is set in the information processing terminal 112 so as to correspond to the concerned client on the LAN 113. Each client can obtain image data by accessing the allocated memory area.

The image reading apparatus 201 and the information processing terminal 112 communicate with each other using respective CPU's.

Figure 3:
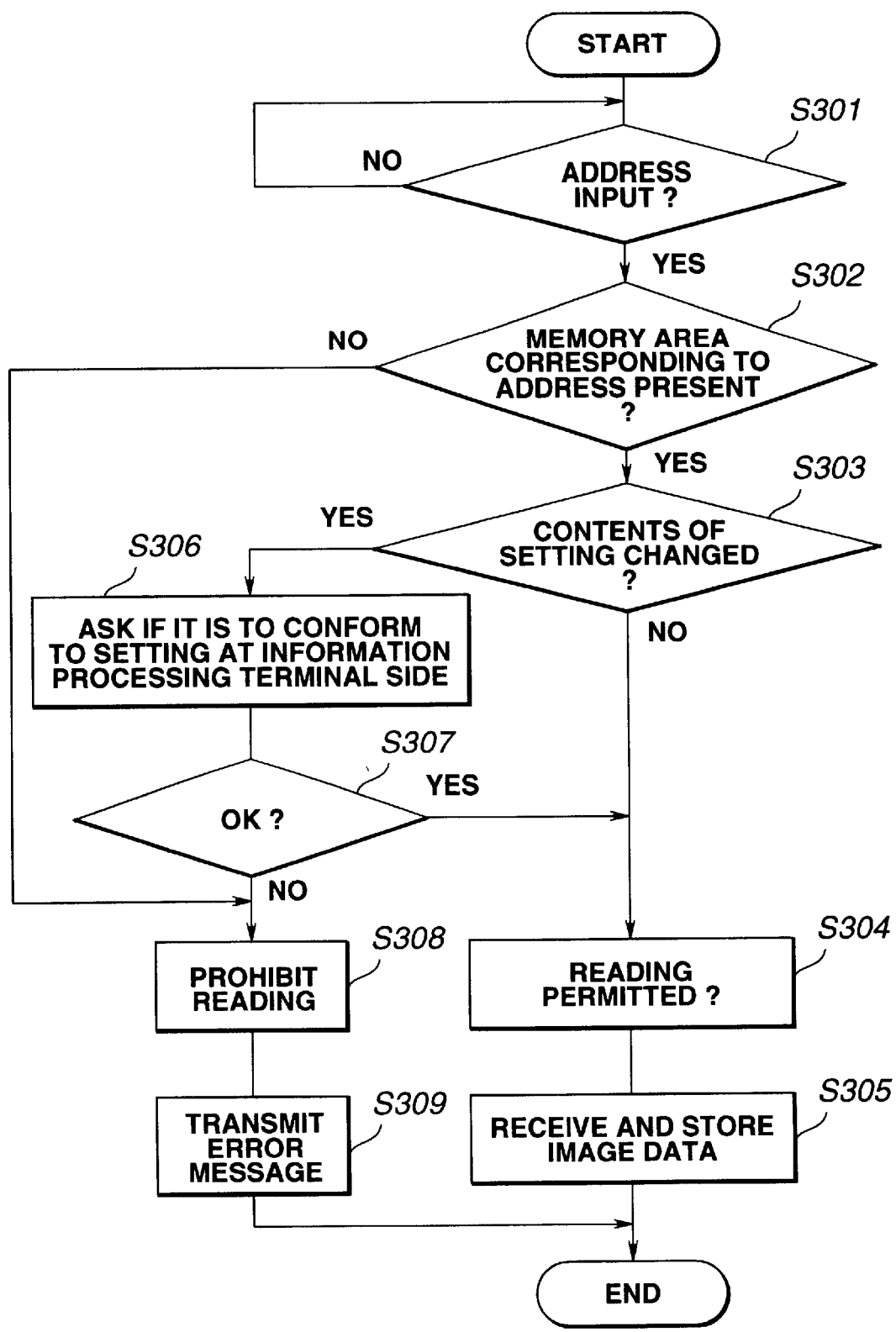
FIG. 3 is a flowchart illustrating the flow of processing according to the first embodiment.

FIG. 3 is a flowchart illustrating the flow of processing executed by the information processing terminal 112 in processing performed by the image reading system of the first embodiment. This flowchart illustrates the flow of processing executed by the CPU of the information processing terminal 112 based on program data installed in the storage device of the information processing terminal 112.

An image reading operation is executed by the user by setting the original on the image reading apparatus 201, and assigning an address and instructing the start of reading through the operation unit 105. Information relating to the address may be registered in advance in the RAM, and may be selected using a one-touch key or the like.

First, in step S301, it is determined if the address of a communication partner to whom data of the read original is to be output has been input from the operation unit 105 of the image reading apparatus 201. If the result of the determination is affirmative, the process proceeds to step S302, where it is determined if a memory area corresponding to the input address is present (set) within the storage device controlled by the information processing terminal 112.

If the result of the determination in step S302 is affirmative, the process proceeds to step S303, where it is determined if there is a change in the set contents relating to the client, for example, a network address, such as an IP address or the like, in this memory area. Only a change in the setting of distribution of data to the client on the LAN 113 is dealt with as a change in this step. The presence of a change is determined by comparing the contents relating to the assigned address stored in the RAM 103 with the contents of the storage device of the information processing terminal 112.

If the result of the determination in step S303 is negative, the process proceeds to step S304, where a command to permit the start of reading of the image of the original is transmitted to the image reading apparatus 201. Upon reception of the command, the image reading apparatus 201 starts reading of the image of the original. The reading operation may be started by depressing a start key of the operation unit 105 by the user if necessary after the image reading apparatus 201 has received the command to permit reading.

In step S305, image data obtained by reading the original by the image reading apparatus 201 is received via the I/F control unit 110, and is stored in the memory area corresponding to the address input in step S301 within the storage device under the control of the information processing terminal 112. Thereafter, a reception-notification mail may be transmitted to the client corresponding to the address if necessary so that the client can easily extract the image data.

If the result of the determination in step S303 is affirmative, the process proceeds to step S306, where a message is sent asking the image reading apparatus 201 if it is to conform to the contents set at the information processing terminal 112. Then, in step S307, it is determined if there is an answer of OK to the message from the operation unit 105 of the image reading apparatus 201. If the result of the determination in step S307 is affirmative, the process proceeds to step S304, and processing of reading the original is executed in the above-described manner.

If the result of the determination in step S302 is negative, i.e., if the corresponding memory area is not present (or is not properly set), or if the result of the determination in step S307 is negative, i.e., if OK has not been instructed (or NO has been instructed), the process proceeds to step S308, where a command to prohibit reading of the image of the original is transmitted to the image reading apparatus 201 so that a request for reading from the image reading apparatus 201 is not accepted. Then, in step S309, a message indicating the fact of prohibiting reading and the reason for the prohibition is transmitted in order to be displayed on the operation unit 105 of the image reading apparatus 201.

As described above, according to the first embodiment, it is possible to prevent a useless reading operation and data transfer within the system when there is no assigned address or in the case of possible mistransfer of data due, for example, to a change in the set contents. Furthermore, since various kinds of messages are transmitted to the image reading apparatus, it is possible to promptly transmit information to the operator and to improve the operability of the apparatus.

Second Embodiment

Next, a second embodiment of the present invention will be described. Since the system configuration of the second embodiment is the same as that shown in FIGS. 1 and 2, a description thereof will be omitted.

Figure 4:
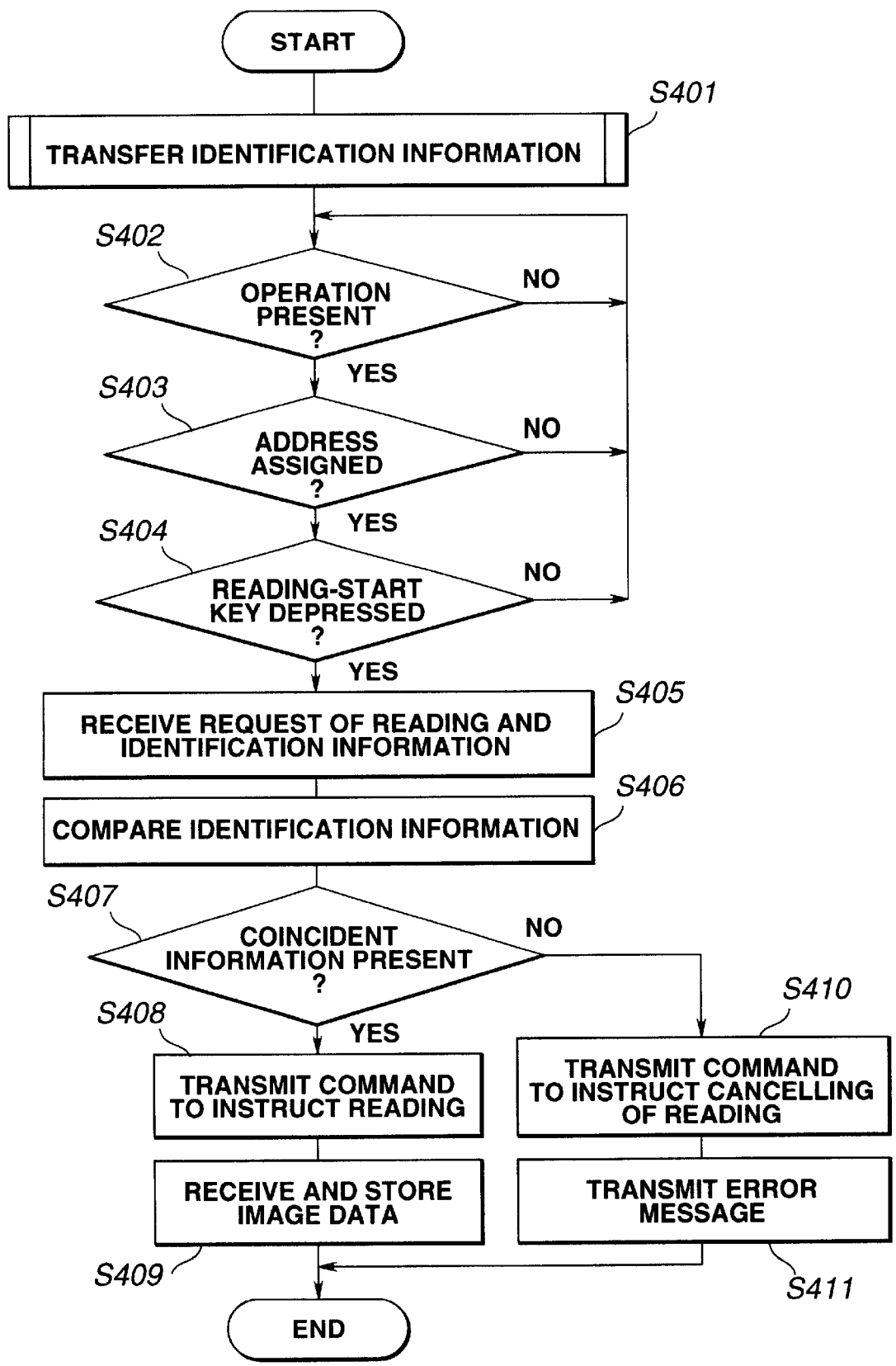
FIG. 4 is a flowchart illustrating the flow of processing according to a second embodiment of the present invention.

FIG. 4 is a flowchart illustrating the flow of the processing of the information processing terminal 112 in the second embodiment. This flowchart illustrates the flow of control performed by the CPU of the information processing terminal 112 based on a program installed in the storage device provided in the information processing terminal 112.

When the system has been started, for example, by turning on the power supply, then, in step S401, identification information relating to each client (the name and the network address of the user) on the LAN 113 stored in advance in the storage device of the information processing terminal 112 is transferred to the RAM 103 of the image reading apparatus 201. The process then proceeds to a waiting state, where it waits until an operation to request reading of an image is performed by the operator.

When it is determined that the operation unit 105 of the image reading apparatus 201 has been operated by the operator, the process proceeds to step S403, where it is determined if an address has been assigned. For assigning an address, the identification information transferred in step S401 is displayed on the operation unit 105 to be confirmed. If the result of the determination in step S403 is affirmative, the process proceeds to step S404, where it is determined if a reading-start key to request reading provided on the operation unit 105 has been depressed. If the result of the determination in step S404 is affirmative, the process proceeds to step S405. The order of steps S403 and S404 may be inverted.

In step S405, the request for reading and the assigned identification information are received as additional information to the latest response (a response to a command from the information processing terminal 112). Then, in step S406, the received identification information is compared with each identification information stored in the storage device of the information processing terminal 112. If coincident information is present, the process proceeds to step S408, where a command to instruct reading is transmitted to the image reading apparatus 201. Then, in step S409, the image reading apparatus 201 stores image data obtained by reading the image of the original in a memory area corresponding to the assigned identification information received via the I/F control unit 110. On the other hand, if there is no coincident information as a result of determination in step S407, this indicates that the assigned identification information is absent or rewritten, and the process proceeds to step S410, where a command to instruct cancelling of reading is transmitted to the image reading apparatus 201. Then, in step S411, a message indicating, for example, that a client corresponding to the assigned identification information is absent is transmitted to the image reading apparatus 201. Instead of transmitting the message in step S411, a message corresponding to the transmission of the command in step S410 may be stored in the image reading apparatus 201, and this message may be output and displayed on the operation unit 105 when the command to instruct cancelling of reading has been received from the information processing terminal 112.

As described above, according to the second embodiment, since identification information is transferred when starting the system, it is possible to minimize the occurrence of problems, such as the absence of a client to which data is to be transferred, and the like. Furthermore, by performing transfer of identification information in step S401 periodically or when identification information is updated in the information processing terminal 112, the above-described problems can be further minimized. Since it is difficult to provide complete synchronism between identification information stored in the information processing terminal 112 and identification information stored in the image reading apparatus 201, the above-described processing in the first and second embodiments are effective.

In the first and second embodiments, since information relating to a plurality of clients to which data is to be transmitted is stored in the image reading apparatus side, the operator can promptly assign an address, and data can be efficiently transferred. Furthermore, since it is confirmed if the client selected by the operator from among the plurality of clients is appropriate, data can be efficiently transferred, and normal image reading processing can be assuredly performed.

Although in the foregoing embodiments, the objects of the invention are realized in the system including the image reading apparatus 201 and the information processing terminal 112, the present invention is not limited to such an approach, but may also be realized in a single apparatus. In such a case, the apparatus is directly connected the LAN 113, and identification information relating to a client is confirmed in a memory within the apparatus (when information relating to clients on the LAN 113 is controlled by the apparatus), or by asking a file server on the LAN 113 whenever necessary (when the file server controls information relating to clients on the LAN 113). Of course, instruction of a client and reading of an image of an original are performed by the apparatus.

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may also be achieved by supplying an apparatus connected to various kinds of devices so as to operate them in order to realize the functions of the above-described embodiments or a computer within a system with program codes of software for realizing the functions of the embodiments, and operating the devices in accordance with a program stored in the system or a computer (a CPU or an MPU (microprocessor unit)) of the apparatus.

In such a case, the program codes themselves of the software realize the functions of the above-described embodiments, so that the program codes themselves, and means for supplying the computer with the program codes, for example, a storage medium storing such program codes, constitute the present invention.

For example, a floppy disk, a hard disk, an optical disk, a magnetooptical disk, a CD(compact disk)-ROM, a magnetic tape, a nonvolatile memory card, a ROM or the like may be used as the storage medium storing such program codes.

When the functions of the above-described embodiments are realized by executing supplied program codes by a computer, or when the functions of the embodiments are realized by cooperation of the program codes with an OS (operating system), other application software or the like, also, such program codes are, of course, included within embodiments of the present invention.

The present invention may, of course, be applied to a case in which, after storing supplied program codes in a memory provided in a function expanding board of a computer or in a function expanding unit connected to the computer, a CPU or the like provided in the function expanding board or the function expanding unit performs a part or the entirety of actual processing based on instructions of the program codes, and the functions of the above-described embodiments are realized by the processing.

The individual components shown in outline or designated by blocks in the drawings are all well-known in the data input system arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing apparatus, comprising:
   an input unit adapted to selectively input data;
   a storage unit adapted to store information relating to a plurality of destinations, the plurality of destinations being those to which the data inputted by said input unit is to be outputted;
   an assignment unit adapted to assign a desired destination from among the plurality of destinations stored in said storage unit;
   a confirmation unit adapted to confirm, to a specified terminal that is different from the assigned destination, whether information relating to the assigned destination stored in said storage unit is proper or not to provide a confirmation result; and
   a controller adapted to control said input unit to permit input of the data or to prohibit input of the data depending on the confirmation result.

2. A data processing apparatus according to claim 1, wherein said apparatus is connectable to a local area network.

3. A data processing apparatus according to claim 2, wherein the assigned destination corresponds to a client on the local area network.

4. A data processing apparatus according to claim 1, wherein the assigned destination corresponds to a predetermined memory area of a storage device.

5. A data processing apparatus according to claim 1, wherein said controller controls said input unit to prohibit input of the data when the confirmation result indicates that the assigned destination is not available to receive the data.

6. A data processing apparatus according to claim 1, wherein said controller controls said input unit to prohibit input of the data when the confirmation result indicates that information relating to the assigned destination has changed.

7. A data communication apparatus according to claim 1, further comprising an output unit adapted to output a message indicating prohibition of input of the data when said controller controls said input unit to prohibit input of the data.

8. A data processing method, comprising the steps of:
   selectively inputting data;
   storing information relating to a plurality of destinations, the plurality of destinations being those to which the data inputted in said inputting step is to be outputted;
   assigning a desired destination from among the plurality of destinations stored in said storing step;
   confirming, to a specified terminal that is different from the assigned destination, whether information relating to the assigned destination stored in said storing step is proper or not to provide a confirmation result; and
   controlling said inputting step to permit input of the data or to prohibit input of the data depending on the confirmation result.

9. A data processing method for controlling an information processing terminal, comprising the steps of:
   selectively inputting data from an input device separately connected to the information processing terminal;

managing information relating to a plurality of destinations;

identifying, from among the plurality of destinations, an identified destination to which the data inputted in said inputting step is to be outputted, based on an inputted destination received from the input device;

confirming whether information relating to the identified destination is proper or not based on the managed information to provide a confirmation result; and controlling said inputting step to permit input of the data or to prohibit input of the data depending on the confirmation result.

10. A computer-readable storage medium storing a program for causing an apparatus to perform a data processing method for controlling an information processing terminal, the program comprising:

code for a input step of selectively inputting data from an input device separately connected to the information processing terminal;

code for a management step of managing information relating to a plurality of destinations;

code for a discrimination step of discriminating, from among the plurality of destinations, a discriminated destination to which the data inputted in the input step is to be outputted, based on an inputted destination received from the input device;

code for a confirmation step of confirming whether information relating to the discriminated destination is proper or not based on the managed information to provide a confirmation result; and code for a control step of controlling the input step to permit input of the data or to prohibit input of the data depending on the confirmation result.

11. A method for controlling a system that includes an image reading apparatus for reading an image of an original and an information processing terminal for controlling the image reading apparatus, said method comprising the steps of:

in the image reading apparatus:

selectively reading the image of the original to provide image data; and storing information relating to a plurality of destinations, the plurality of destinations being those to which the image data from said reading step is to be outputted;

assigning a desired destination from among the plurality of destinations stored in said storing step, and in the information processing terminal:

managing information relating to a plurality of destinations;

confirming whether information relating to the assigned destination assigned in said assigning step is proper or not based on the managed information to provide a confirmation result; and controlling the image reading apparatus to cause said reading step to permit reading of the image of the original or to prohibit reading of the image of the original depending on the confirmation result.

* * * * *

UNITED STATES PATENT AND TRADEMARK OFFICE
CERTIFICATE OF CORRECTION

PATENT NO. : 6,570,679 B2
DATED : May 27, 2003
INVENTOR(S) : Masaru Saruwatari

It is certified that error appears in the above-identified patent and that said Letters Patent is hereby corrected as shown below:

<u>Column 9,</u>
Line 17, "a input" should read -- an input --.

<u>Column 10,</u>
Line 11, "and" should be deleted.
Line 15, "outputted;" should read -- outputted; and --.

Signed and Sealed this

Seventh Day of October, 2003

JAMES E. ROGAN
*Director of the United States Patent and Trademark Office*